United States Patent [19]

Marco et al.

[11] 3,958,703

[45] May 25, 1976

[54] SIDE LOADER MAIN FRAME

[75] Inventors: George P. Marco, Homewood; Edward V. Krutis, Monee, both of Ill.

[73] Assignee: Allis-Chalmers Corporation, Milwaukee, Wis.

[22] Filed: Nov. 13, 1974

[21] Appl. No.: 523,488

[52] U.S. Cl. .................. 214/75 G; 214/670

[51] Int. Cl.$^2$ .................. B60P 1/44

[58] Field of Search .................. 214/75 G, 390, 670

[56] References Cited

UNITED STATES PATENTS

| | | | |
|---|---|---|---|
| 3,151,755 | 10/1964 | Quayle | 214/75 G X |
| 3,756,437 | 9/1973 | Bowman-Shaw | 214/75 G |

FOREIGN PATENTS OR APPLICATIONS

| | | | |
|---|---|---|---|
| 820,781 | 9/1959 | United Kingdom | 214/670 |

*Primary Examiner*—Robert G. Sheridan
*Attorney, Agent, or Firm*—Charles L. Schwab

[57] ABSTRACT

A side loader main frame includes front and rear sections which are rigidly interconnected by a bridge to form a pocket for a laterally traversing mast. The bridge is a boxlike torque tube with openings in the laterally inner vertical wall through which transversely extending guide structures for the traversing mast extend. The traversing mast has a pair of supports with rollers which extend into the openings upon lateral retraction of the mast, thereby permitting the uprights of the mast to be closely adjacent to the bridge. The bridge includes a pair of laterally spaced and longitudinally extending vertical walls, horizontally disposed top and bottom walls and a pair of horizontal intermediate walls spaced above and below the openings, respectively. The frame is constructed to obtain great strength and yet keep the bridge relatively narrow in lateral width. The provision of openings in the bridge permits the uprights of the mast to be retracted to a position adjacent the bridge, thereby allowing the full decks of the front and rear sections of the frame to be used for load support.

10 Claims, 4 Drawing Figures

SIDE LOADER MAIN FRAME

BACKGROUND OF THE INVENTION

Heretofore, others have provided main frames for side loader trucks such as are illustrated in U.S. Pat. Nos. 2,621,812; 3,712,492; 3,735,885; and 3,756,437. The bridge between the front and rear sections of a side loader must be capable of resisting considerable torsional loads. At the same time it is desired to keep the bridge structure relatively narrow in its lateral width so as to permit the traversing mast to retract sufficiently far to fully utilize the decks on the front and rear sections for supporting the payload.

BRIEF DESCRIPTION OF THE INVENTION

The main frame of a side loader vehicle includes front and rear sections rigidly interconnected by a bridge at one lateral side of the vehicle so as to present a pocket in which a traversing mast may laterally extend and retract. The bridge includes a pair of longitudinally extending laterally spaced vertical walls, the laterally inner one of which presents a pair of openings into which transversely extending guide structures for the traversing mast extend. This permits the roller support for the mast to extend into the openings in the retracted position of the mast thereby permitting the mast to retract sufficiently to deposit the load on the deck and at the same time permits the lateral dimension of the bridge to be sufficient to provide the necessary strength to withstand the loads to which it is subjected. The bridge is of box construction with a pair of intermediate horizontal walls on opposite vertical sides of the openings.

DETAILED DESCRIPTION OF THE DRAWINGS

Figure 2:
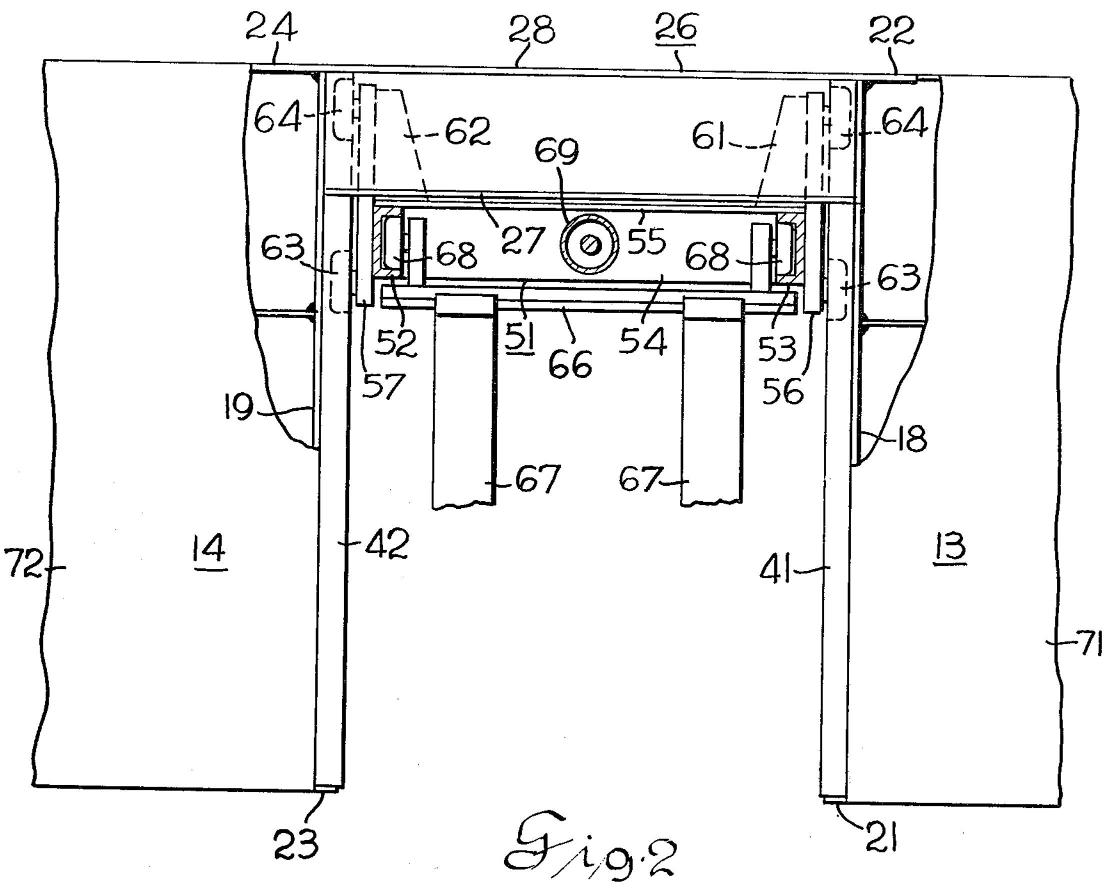
FIG. 2 is a top view of the side loader shown in FIG. 1 with parts broken away for illustrating purposes.

Referring to the drawings, the main frame 11 of a side loader vehicle includes a front section 13 and a rear section 14 which are supported by front and rear wheels 16 and 17, respectively. The front and rear wheel sections 13, 14 are longitudinally spaced from one another and include transversely extending vertical walls 18, 19 which are parallel to one another and are rigidly connected as by welding to vertical side walls 21, 22 and side walls 23, 24, respectively. The frame sections 13 and 14 are rigidly connected to one another by a bridge 26 which includes a pair of laterally spaced, longitudinally extending vertical walls 27, 28. The laterally inner wall 27 is rigidly secured as by welding to the transverse walls 18, 19 and includes wall means defining transverse openings 31, 32 intermediate the top and bottom thereof and adjacent the transverse walls 18, 19 of the front and rear sections 13, 14. The wall 28 of the bridge 26 is preferably integrally formed with the walls 22, 24 of the front and rear sections 13, 14. The bridge 26 includes top and bottom horizontal walls 33, 34 which are rigidly secured as by welding to the vertical walls 18, 19, 27, 28, and in addition, includes a pair of horizontal walls 36, 37 spaced from the top and bottom walls 33, 34 and disposed at vertically opposite sides of the openings 31, 32. The walls 36 and 37 are rigidly secured as by welding to the vertical walls 18, 19, 27 and 28. A pair of guide structures in the form of channels 41, 42 are rigidly secured as by welding to the longitudinally confronting vertical end walls 18, 19 of the sections 13, 14. The channels 41, 42 extend substantially the full width of the side loader, that is, the full width of the vertical end walls 18, 19, and extend through the pockets 31, 32.

The side loader includes a traversing mast 51 having a pair of uprights in the form of channels 52, 53 which are rigidly interconnected at their bottom by a bottom plate 54 and by a back plate 55. A pair of transversely extending supports 56, 57 are secured as by welding to the upright channels 52, 53 and to the plate 55. In order to strengthen the supports 56, 57, a pair of tapered brackets 61, 62 are rigidly secured as by welding to the supports 56, 57 and to the back plate 55. Laterally spaced rollers 63, 64 are rotatably mounted on the supports 56, 57 and are guidedly supported in the channels 41, 42 whereby the traversing mast 51 may move transversely between the retracted position, in which illustrated, to an extended loading position adjacent the open end of the pocket in which it traverses. A conventional carriage 66 with lift forks 67 is supported in the uprights 56, 57 by rollers 68 and is moved vertically by a lift jack 69 through conventional lift chains, not shown.

In FIG. 2, the deck plate 70 on top of the bridge or torque tube structure 26 has been removed as have also portions of the decks 71, 72 of the front and rear sections 13, 14. As is apparent upon viewing FIGS. 2 and 3, the traversing support structure for the mast 51 includes portions of supports 56, 57 and brackets 61, 62 which extend into pockets 31, 32 along with rollers 64 when the mast is retracted. The rollers 63 are adjacent the bottom of the mast whereby the rollers 63 will be at the open end of the channels 41, 42 when the mast is transversely extended to its load receiving position at the side of the truck to which the pocket, formed by the sections 13, 14 and bridge 26, opens.

Figure 1:
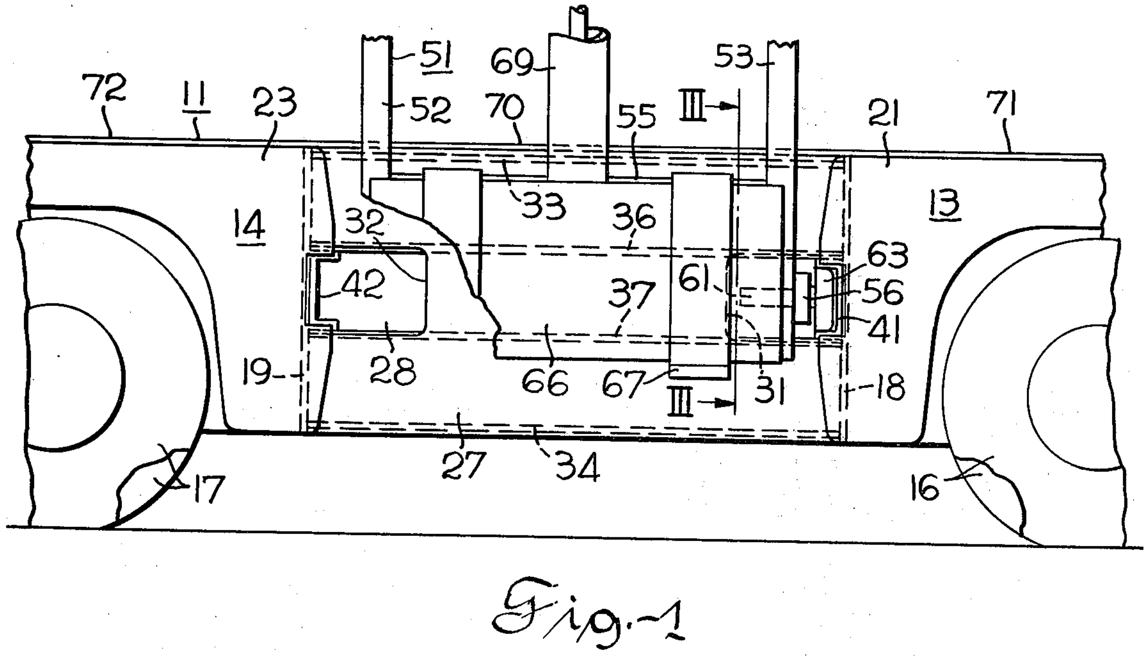
FIG. 1 is a side view of a side loader incorporating the present invention with parts broken away for illustration purposes.
Figure 3:
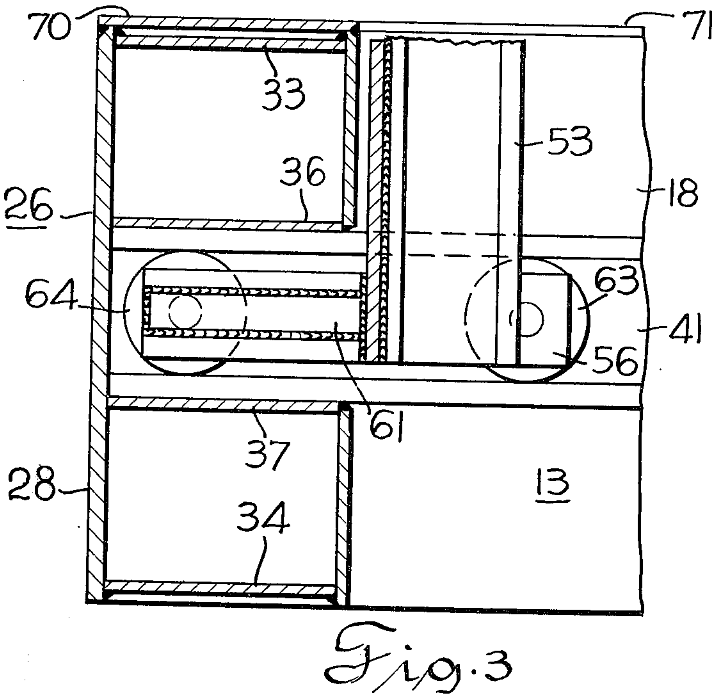
FIG. 3 is a section view taken along the line III-III in FIG. 1.
Figure 4:
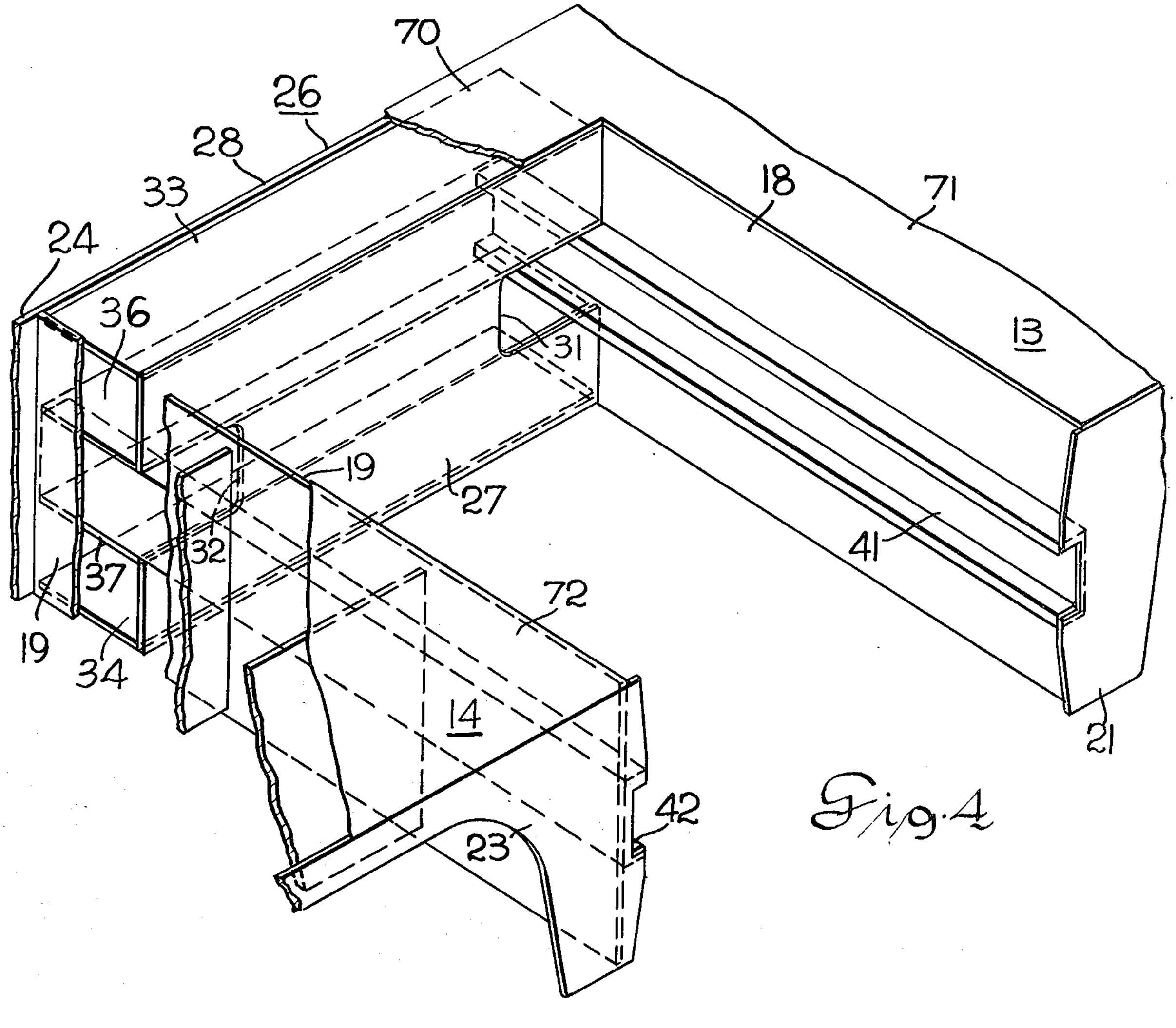
FIG. 4 is an isometric view of part of the main frame of the side loader with parts broken away for illustration purposes.

As is apparent upon viewing FIGS. 1, 3 and 4, the bridge 26 can be considered a single torque tube with internal horizontal bracing walls 36, 37 or as a pair of torque tubes spaced vertically from one another and which are rigidly interconnected by portions of walls 27, 28. When viewing the bridge as a pair of torque tubes, the upper torque tube is formed by walls 33, 27, 36 and 28, and the lower torque tube is formed by walls 34, 27, 37, 28. However viewed, the illustrated torque tube is extremely strong and capable of resisting the torsional loads (and other loads) to which subjected. At the same time, the loader frame can be manufactured from steel plates by conventional welding equipment at an economical cost.

The embodiments of the invention in which an exclusive property or privelege is claimed are defined as follows:

1. In a side loader vehicle, a frame comprising: a front wheel supported section having a vertical side wall at each of its laterally opposite sides and a transverse vertical wall at its rear end rigidly secured to said side walls, a rear wheel supported section having a vertical side wall at each of its laterally opposite sides and a transverse vertical wall at its front end rigidly secured to said side walls and in longitudinally spaced parallel relation to said transverse vertical wall on said front section, a pair of longitudinally extending and vertically spaced torque tubes extending between and rigidly connected to said transverse vertical walls adjacent one lateral side of said frame thereby defining an open pocket in the other lateral side of said frame adapted to receive a traversing mast, and a pair of parallel guide structures rigidly secured to said transverse vertical walls and extending transversely across the width of the latter and between said torque tubes.

2. The frame set forth in claim 1 and further comprising laterally spaced vertical wall means rigidly interconnecting said torque tubes.

3. In a side loader vehicle:

a frame having front and rear wheeled sections, a longitudinally extending bridge at one lateral side of said vehicle integrally connecting said front and rear sections, said bridge including a pair of laterally spaced and longitudinally extending vertical walls integrally connected at their longitudinally opposite ends to said front and rear sections, the laterally inner vertical wall having a pair of longitudinally spaced transverse openings therein at its longitudinally opposite ends, top and bottom horizontal walls rigidly secured to said vertical walls and sections, and intermediate wall means rigidly secured to said vertical walls and sections, a pair of transversely extending guide structures secured, respectively, to the rear side of said front section and to the front side of said rear section and extending, respectively, through said openings, and a mast having a traversing support with transversely spaced rollers in cooperative engagement with said guide structures permitting the mast to be shifted transversely between extended and retracted positions, at least two of said rollers extending into said openings, respectively, when said mast is retracted.

4. The frame of claim 3 wherein said intermediate wall means comprises a pair of horizontal bracing walls disposed on vertically opposite sides of said openings and rigidly secured to said vertical walls and sections.

5. In a side loader vehicle, a frame having a front wheel supported section having a vertical side wall at each of its laterally opposite sides and a transverse vertical wall at its rear end rigidly secured to said side walls, a rear wheel supported section having a vertical side wall at each of its laterally opposite sides and a transverse vertical wall at its front end rigidly secured to said side walls and in longitudinally spaced parallel relation to said transverse vertical wall on said front section, a pair of longitudinally extending and vertically spaced torque tubes extending between and rigidly connected to said transverse vertical walls adjacent one lateral side of said frame thereby defining an open pocket in the other lateral side of said frame adapted to receive support brackets of a traversing mast, and a pair of parallel guide structures rigidly secured to said transverse vertical walls and extending transversely across the width of the latter and between said torque tubes, and a traversing mast having a pair of longitudinally spaced and transversely extending brackets on the bottom thereof and rollers on said brackets in cooperative engagement with said guide structures permitting transverse shifting of said mast between extended and retracted positions, portions of said brackets and rollers thereon being disposed within said pocket in said retracted position of said mast.

6. A frame set forth in claim 5 and further comprising laterally spaced vertical wall means rigidly interconnecting said torque tubes.

7. In a side loader vehicle, a frame including a pair of longitudinally spaced wheel supported sections with decks for receiving cargo, a boxlike torque tube extending between and rigidly connected to said sections at one lateral side of said frame whereby a pocket is defined opening to the other lateral side of a frame, said torque tube having a top wall, a bottom wall, a laterally outer vertical wall, a laterally inner vertical wall presenting openings adjacent said sections and intermediate wall means rigidly connected to said vertical walls and said sections, and a pair of transversely extending guide structures for supporting a traversing mast rigidly secured to said sections and extending into said torque tube through said openings, and a traversing mast disposed in said opening and have a pair of support brackets extending transversely from the bottom thereof in the direction toward said openings and rollers mounted on said brackets in rolling engagement with said guide structures permitting transverse shifting of said mast between extended and retracted positions, portions of said brackets and rollers thereon extending into said openings when said mast is in its retracted position.

8. The frame set forth in claim 7 wherein said guide structures extend substantially across the lateral width of said sections and said openings are disposed approximately midway between the top and bottom of said torque tube.

9. In a side loader vehicle, a frame comprising:

front and rear wheeled sections, a longitudinally extending bridge at one lateral side of said vehicle integrally connecting said front and rear sections, said bridge including a pair of laterally spaced and longitudinally extending vertical walls integrally connected at their longitudinally opposite ends to said front and rear sections, the laterally inner vertical wall having a pair of longitudinally spaced transverse openings therein at its longitudinally opposite ends, top and bottom walls, and horizontal walls rigidly secured to said vertical walls and to said front and rear sections, said bottom wall being disposed below said openings, and a pair of transversely extending guide structures secured, respectively, to the rear side of said front section and to the front side of said rear section and extending respectively through said openings, said guide structures being adapted to receive the guide rollers of a transversing support of a mast and said openings being proportioned to permit portions of said transversing support to extend thereinto.

10. The frame of claim 9 wherein said bridge further comprises a pair of horizontal bracing walls disposed on vertically opposite sides of said openings and rigidly secured to said vertical walls and sections.

* * * * *